(12) United States Patent
Parker et al.

(10) Patent No.: US 10,187,288 B2
(45) Date of Patent: Jan. 22, 2019

(54) COMMUNICATING DATA LINK INFORMATION USING A LIGHT SOURCE

(71) Applicant: Caterpillar Inc., Peoria, IL (US)

(72) Inventors: John David Parker, Peoria, IL (US); Joseph Kuriakose George, Kerala (IN); Rick C Nystrom, Minier, IL (US)

(73) Assignee: Caterpillar Inc., Deerfield, IL (US)

( * ) Notice: Subject to any disclaimer, the term of this patent is extended or adjusted under 35 U.S.C. 154(b) by 9 days.

(21) Appl. No.: 15/645,203

(22) Filed: Jul. 10, 2017

(65) Prior Publication Data

US 2018/0262415 A1 Sep. 13, 2018

Related U.S. Application Data

(60) Provisional application No. 62/469,168, filed on Mar. 9, 2017.

(51) Int. Cl.
*H04L 12/28* (2006.01)
*H04L 12/26* (2006.01)
*G08B 5/36* (2006.01)
*F02B 77/08* (2006.01)

(52) U.S. Cl.
CPC .............. *H04L 43/50* (2013.01); *G08B 5/36* (2013.01); *F02B 77/083* (2013.01)

(58) Field of Classification Search
CPC .................. H04L 43/50; G08B 5/36
USPC .............................. 370/241–255
See application file for complete search history.

(56) References Cited

U.S. PATENT DOCUMENTS

| 4,852,657 | A | 8/1989 | Gerald et al. |
| 7,519,000 | B2* | 4/2009 | Caveney ................. H04L 12/10 370/242 |
| 7,627,304 | B2* | 12/2009 | Koga ..................... H04B 3/548 340/12.32 |
| 8,189,470 | B2* | 5/2012 | Nakashima ......... H04L 12/4625 370/231 |
| 8,549,775 | B2 | 10/2013 | Henry et al. |
| 8,718,044 | B2* | 5/2014 | Zancker .............. H04L 41/5009 370/236 |
| 8,886,391 | B2 | 11/2014 | Thomas et al. |
| 9,026,317 | B2 | 5/2015 | Jiro et al. |
| 9,115,663 | B2 | 8/2015 | Tony et al. |
| 2003/0174812 | A1* | 9/2003 | Chen ....................... H04L 1/243 379/1.03 |
| 2007/0140138 | A1* | 6/2007 | Goffin ............... H04L 29/06027 370/252 |

(Continued)

*Primary Examiner* — Thai D Hoang (57) ABSTRACT

A device and a method for communicating data link information associated with a machine is provided. The device includes a light source comprising a Light Emitting Diode (LED). The device includes a controller configured to transmit a query, to the machine, for different types of information related to the machine, the different types of information including a first type of information, a second type of information, and a third type of information. Upon receiving a response indicating the availability of one or more types of information among the different types of information, the controller is configured to provide a first indication, a second indication, a third indication, a fourth indication, or a fifth indication. The controller is further configured to transmit data regarding the one or more types of information that are available.

20 Claims, 6 Drawing Sheets

(56) References Cited

U.S. PATENT DOCUMENTS

| | | | | |
|---|---|---|---|---|
| 2007/0268837 A1* | 11/2007 | Melton | ............... | H04L 41/0886 |
| | | | | 370/252 |
| 2008/0043630 A1* | 2/2008 | Chen | ................... | H04L 43/0817 |
| | | | | 370/244 |
| 2015/0048952 A1 | 2/2015 | Murphy | | |
| 2015/0078185 A1* | 3/2015 | Syed | ................... | H04W 64/003 |
| | | | | 370/252 |
| 2015/0206417 A1* | 7/2015 | Bush | ................... | G08B 25/016 |
| | | | | 340/6.1 |
| 2015/0257083 A1* | 9/2015 | Kim | ................... | H04L 41/0803 |
| | | | | 370/254 |
| 2016/0105359 A1* | 4/2016 | Kim | ...................... | H04L 43/08 |
| | | | | 370/252 |
| 2016/0379176 A1* | 12/2016 | Brailovskiy | ....... | G06K 9/00664 |
| | | | | 705/26.7 |
| 2017/0287290 A1* | 10/2017 | Nelson | ..................... | G08B 5/36 |
| 2017/0301192 A1* | 10/2017 | Green | ..................... | G08B 5/36 |
| 2017/0316660 A1* | 11/2017 | Chong | ..................... | G08B 5/36 |

* cited by examiner

COMMUNICATING DATA LINK INFORMATION USING A LIGHT SOURCE

TECHNICAL FIELD

The present disclosure relates to communicating data link information related to a machine. More particularly, the present disclosure relates to device and method for communicating data link information related to a machine using a light source.

BACKGROUND

Engine control modules (or ECMs) are used extensively in machines to perform a variety of operations. Some exemplary uses of engine control modules include transmission control, cruise control, and/or anti-lock braking systems. As the use of these engine control modules increases, the level of complexity of communication between these modules and the machine also increases.

In order to deal with these increasingly complex communications, the Society of Automotive Engineers (SAE) has developed standards pertaining to the network of communications between electronic devices in vehicles. One of these standards is J1939. The J11939 standard specifies a high-speed communications network to support real-time closed loop control functions between ECMs, which may be physically distributed throughout the machine and may include a series of data links to each particular ECM.

A problem may arise when the data link (to a particular ECM) becomes inoperative, or stops communicating. In some instances, the data link may become inoperative without the knowledge of the machine's operator or a service technician. Because the operator or service technician may be unaware that the machine failure is due to the data link problem, the operator or service technician may spend valuable time trouble-shooting the ECM or other machine systems to determine the cause of the improper behavior of the machine.

Data link monitoring devices currently exist that diagnose problems associated with data links in machines. However, these devices merely indicate whether there is any activity on a data link. Furthermore, during aftermarket installations, the installation technician may be unware of the type(s) of information that may be available, on the machine for monitoring. An "install and see" approach is often used to identify the types of information available. In this approach, the installation technician first installs the data monitoring device and then checks the types of information that are available. However, this approach is time consuming and inefficient.

The present disclosure is directed to overcoming one or more of the problems set forth above and/or other problems of the prior art. The present invention is directed to solving one or more of the problems as set forth above.

SUMMARY

In an aspect of the present disclosure, a device for communicating data link information associated with a machine is provided. The device comprises a light source, wherein the light source includes a light-emitting diode (LED). The device includes a controller configured to transmit a query, to the machine, for different types of information related to the machine. The different types of information include a first type of information, a second type of information, and a third type of information. The controller is configured to determine whether a response, to the query, is received from the machine. The controller is configured to provide a first indication, using the light source, when the response is not received. The controller is configured to provide a second indication, using the light source, when the response is received and the response indicates that the different types of information are not available. The controller is configured to provide a third indication, using the light source, when the response is received and the response indicates that the first type of information is available. The controller is configured to provide a fourth indication, using the light source, when the response is received and the response indicates that the second type of information is available. The controller is configured to provide a fifth indication, using the light source, when the response is received and the response indicates that the third type of information is available. The controller is further configured to transmit data regarding one or more types of information, of the different types of information, that are available on the machine when the one or more types of information are available. The data regarding the one or more types of information is transmitted to one or more devices.

In another aspect of the present disclosure, a system for communicating data link information associated with a machine is provided. The system includes a device comprising a light source. The device further includes a controller configured to transmit a query, to a plurality of components of the machine, for different types of information related to the machine. The different types of information include a first type of information, a second type of information, and a third type of information. The controller is configured to determine whether a response, to the query, is received from the machine, wherein the response includes a plurality of types of information. The controller is configured to provide a first indication, using the light source, when the response is not received. The controller analyzes the plurality of types of information. The controller is configured to provide a second indication, using the light source, when the response is received and when the plurality of types of information does not include the different types of information. The controller is configured to provide a third indication, using the light source, when the response is received and when the plurality of types of information includes the first type of information. The controller is configured to provide a fourth indication, using the light source, when the response is received and when the plurality of types of information includes the second type of information. The controller is configured to provide a fifth indication, using the light source, when the response is received and when the plurality of types of information includes the third type of information. The controller is further configured to transmit data regarding the plurality of types of information that are available on the machine when the plurality of types of information are available. The data regarding the plurality of types of information is transmitted to one or more devices.

In yet another aspect of the present disclosure, a method for communicating information associated with a machine is provided. The device includes a light source. The method includes transmitting, by a controller, a query to the machine, for different types of information related to the machine. The different types of information include a first type of information, a second type of information, and a third type of information. The method further includes determining, by the controller, whether a response, to the query, is received from the machine, wherein the response includes a plurality of types of information. The method includes providing, by the controller, a first indication, using the light source, when the response is not received. When the response is received, the method includes analyzing, by the controller, the plurality of types of information. The method includes providing, by the controller, a second indication, using the light source, when the plurality of types of information does not include the different types of information. The method includes providing, by the controller, a third indication, using the light source, when the plurality of types of information includes the first type of information. The method includes providing, by the controller, a fourth indication, using the light source, when the plurality of types of information includes the second type of information. The method includes providing, by the controller, a fifth indication, using the light source, when the plurality of types of information includes the third type of information. The method includes transmitting, by the controller, data regarding the plurality of types of information, of the different types of information, that are available on the machine when the plurality of types of information are available. The data regarding the plurality of types of information is transmitted to one or more devices.

DETAILED DESCRIPTION

Figure 1:
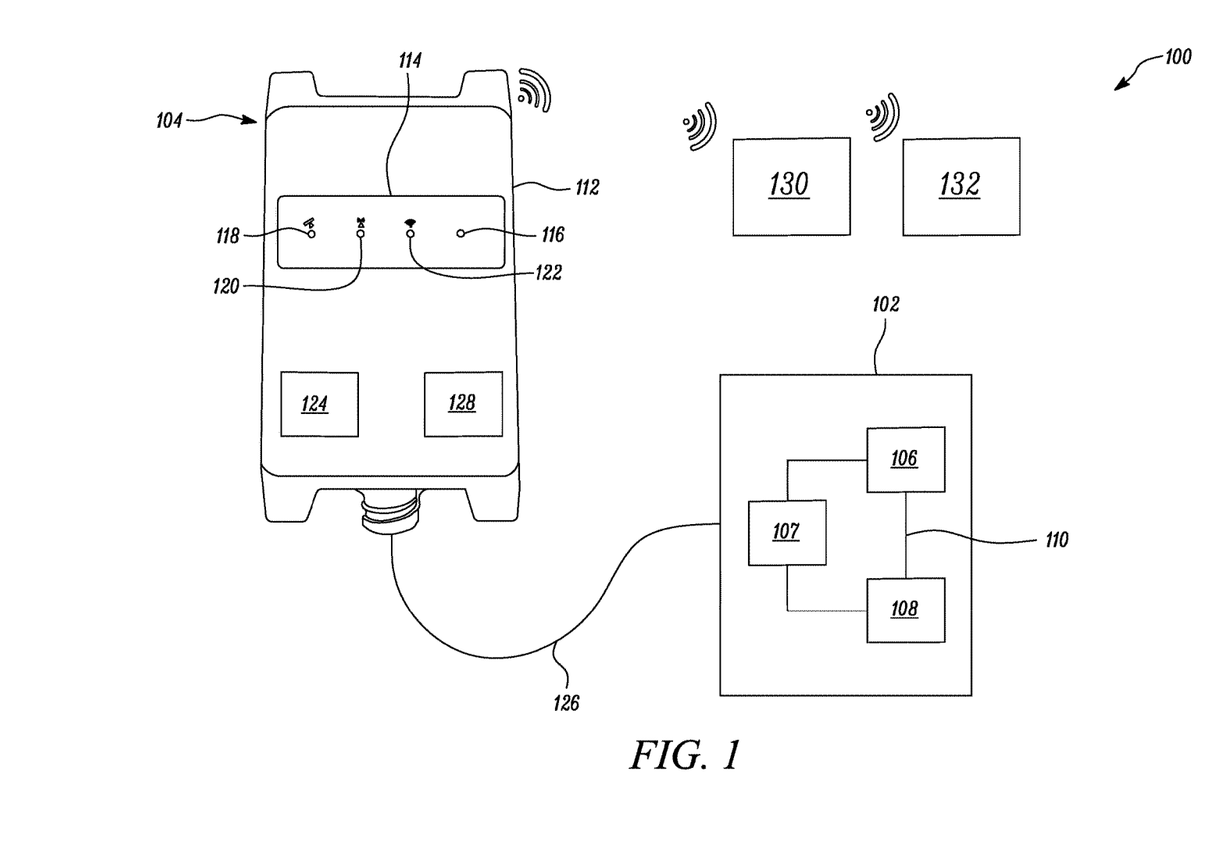
FIG. 1 is a schematic illustration of an exemplary system comprising a device for communicating information associated with a machine, in accordance with some embodiments of the present disclosure.

Wherever possible, the same reference numbers will be used throughout the drawings to refer to same or like parts. FIG. 1 illustrates an exemplary system 100 comprising a machine 102 and a device 104 for communicating data link information associated with the machine 102. The device 104 is configured to retrieve, from the machine 102, different types of information related to the machine 102. Machine 102 may be a fixed machine or mobile machine that may perform some type of operation associated with a particular industry, such as mining, construction, farming, etc. and operate between or within work environments (e.g., a construction site, mine site, power plant, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, on-highway vehicles, or any other type of movable machine that operates in a work environment.

The machine 102 may include a plurality of components. Referring to FIG. 1, the plurality of components may include one or more Engine Control Modules (ECMs) 106, 108 and one or more machine components 107 that may provide information related to the machine, as discussed in further detail below. ECMs 106, 108, and machine components 107 may be connected to each other. ECMs 106, 108, for example, may include an electronically controlled transmission system, anti-lock braking system, and/or cruise control system. ECMs 106, 108 may be configured to control other components or sub-components of the machine 102. For example, the components may include an operator display device, a power system control module, a Global Positioning System (GPS) interface device, an attachment interface, and any other type of component the machine 102 may use to facilitate operations of the machine 102 during run time or non-run time conditions (i.e., machine engine running or not running, respectively). In some embodiments, the machine 102 may include wireless sensors that are linked together to provide different types of information related to the machine 102 to the ECMs 106, 108.

ECMs 106, 108 may be connected using different types of data links 110. The data links 110 may be wireline or wireless. The data links 110 may be a proprietary data link or a non-proprietary data link, such as Society of Automotive Engineers (SAE) standard data links including Controller Area Network (CAN), J1939, or any other standard data link. In some embodiments, the ECM 106 may be configured to, receive data from, and send data to, ECM 108 via the data link 110.

Still referring to FIG. 1, the device 104 includes a housing 112 and a user interface 114. In some embodiments, the user interface 114 may be a display. The user interface 114 includes a first light source 116. In some embodiments, the first light source 116 may be a first Light Emitting Diode (LED) 116. The first light source 116 may indicate one or more different states (e.g., an "off state", a "short blink state", a "slow blink state", a "fast blink state", and/or a "solid on state"). These states are used to provide indications of availability of different types of information on the data links 110. The user interface 114 may also include several other light sources (e.g., LEDs) to indicate other information related to the device 104. Referring to FIG. 1, the user interface 114 may include a second light source 118 to indicate whether the device 104 is having Global Positioning System (GPS) connectivity, a third light source 120 to indicate whether the device 104 is having internet connectivity, and a fourth light source 122 to indicate whether the device 104 is having a Wi-Fi connectivity. The user interface 114 may optionally comprise an "up" arrow key and a "down" arrow key. Additionally, or alternatively, the "up" arrow key is a "Y" or yes key and "down" arrow key is a "N" or no key. The "up" arrow key and "down" arrow key may be used to scroll through information provided by the user interface 114, and acknowledge prompts provided on the user interface 114.

Still referring to FIG. 1, the device 104 includes a controller 124 to monitor communications in the machine 102. The controller 124 may be configured to monitor the communications, such as, for example, J11939 communications, over one or more data links 110. The device 104 may be connected to the machine 102 via a physical connection (e.g., cable harness 126) or a wireless connection. The cable harness 126 may have a 9-pin connector, a 12-pin connector, a 14-pin connector, or other types of connectors which may be used to connect to a port of the machine 102 (e.g., a 9-pin service port, a 12-pin service port or a 14-pin service port of the machine 102 respectively). The controller 124 is configured to transmit a query to the plurality of components of the machine 102 for different types of information related to the machine 102. The information may be available on one or more data links 110. The controller 124 is configured to receive a response from the machine 102 based on the availability of the different types of information on the data links 110. The controller 124 may comprise one or more suitable logics, circuitries, interfaces, and/or codes that may be configured to execute a set of instructions to monitor communications in the machine 102.

The device 104 optionally includes a memory 128. The memory 128 may store instructions for monitoring communication in the machine 102. The memory 128 is used to store software for causing the controller 124 to perform the functions described herein and may also store other information pertinent to operation of the device 104. In some embodiments, the memory 128 can be updated or reprogrammed via a host computer connected through a connector. The memory 128 may be configured to store information received from the machine 102 by the controller 124.

Figure 2:
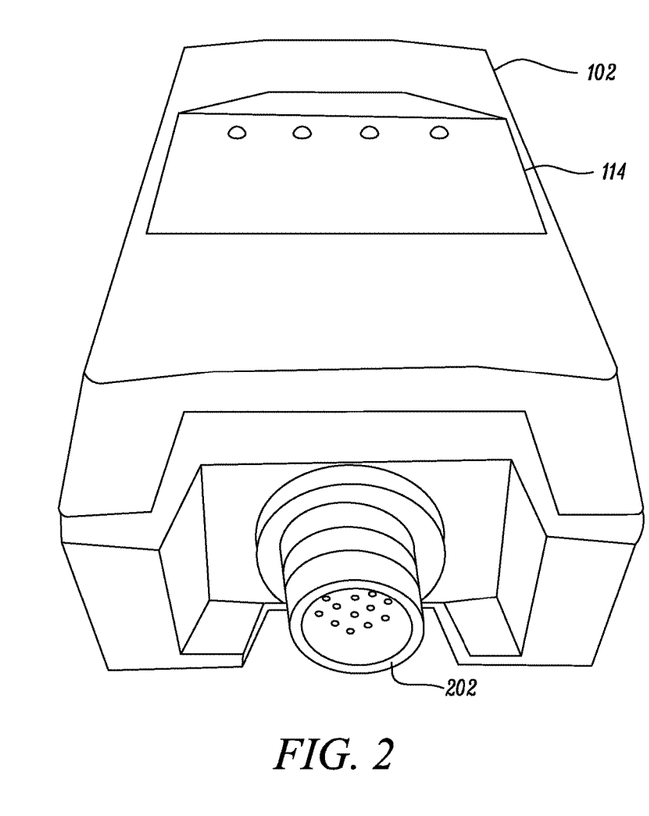
FIG. 2 is a perspective view of the device for communicating information associated with a machine, in accordance with some embodiments of the present disclosure.

FIG. 2 illustrates a perspective view of the device 104 in accordance with some embodiments of the invention. The device 104 includes a connector 202 to releasably connect to the machine 102 using the cable harness 126. As shown in FIG. 2, the connector 202 may be used to connect the device 104 to the machine 102. In some embodiments, the connector 202 may be used to connect the device 104 to the machine 102 via a cable harness, such as, for example, via a 12-pin cable harness. Further, the device 104 may be configured to use a battery of the machine 102 to provide power to the device 104.

FIGS. 3A to 3D illustrate indications provided by the first light source 116 based on responses received by the controller 124 in accordance with some embodiments of the invention. To start the operation, the device 104 is plugged into the machine 102 and an engine (not shown) of the machine 102 is turned on. The controller 124 of the device 104 transmits a query to the machine 102 requesting different types of information related to the machine 102. The query may be transmitted to the plurality of components including multiple ECMs 106, 108 and machine components 107 of the machine 102. In some embodiments, the ECM 106 may be connected using a first data link and the ECM 108 may be connected using a second data link, different from the first data link. The machine 102 may process the query and identify one or more types of information that are available. In case, the device 104 does not receive a response from the machine 102, the device 104 is configured to provide a first indication using the first light source 116. The first indication corresponds to the "off" state and indicates that there is no activity over the one or more data links 110 in the machine 102. The light source 116 shows no light during the "off" state.

In case the response is received, the controller 124 may be configured to analyze the received response and accordingly provide an indication, using the first light source 116, based on a plurality of types of information included in the response. In some embodiments, the response may be a stream of data. In some embodiments, controller 124 may be configured to analyze the received response using a data structure defining a relationship between the different types of information included in the response and the different types of indications. In some embodiments, the data structure may be implemented as a look up table. The data structure may be stored in the memory 128 of the device 104. Accordingly, in some embodiments, the controller 124 analyzes the received response by performing a lookup of the data structure, using the information included in the response and identifies the corresponding indication.

Figure 3A:
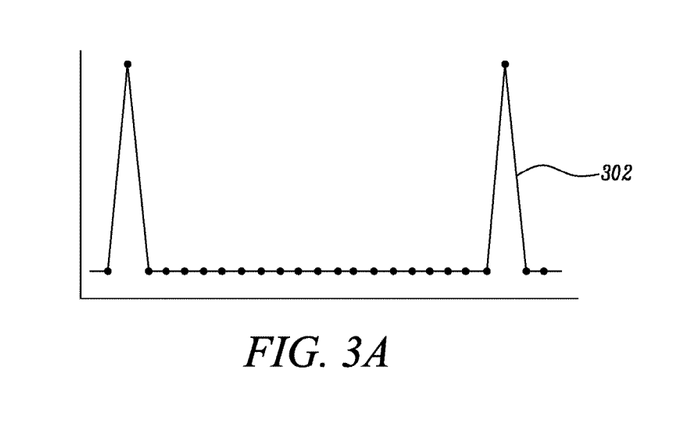
FIGS. 3A to 3D illustrate example indications provided by a light source of the device, in accordance with some embodiments of the present disclosure.

When the response indicates that none of the different types of information is available, the controller 124 provides a second indication using the first light source 116. Referring to FIG. 3A, a graph 302 illustrates the second indication provided by the first light source 116. The second indication represents the "short blink" state during which the first light source 116 blinks for a brief time. In other words, the first light source 116, is "on" for a very short time interval, for example, 1 second and then the first light source 116 is "off" for a relatively longer time interval, for example, 10 seconds.

Figure 3B:
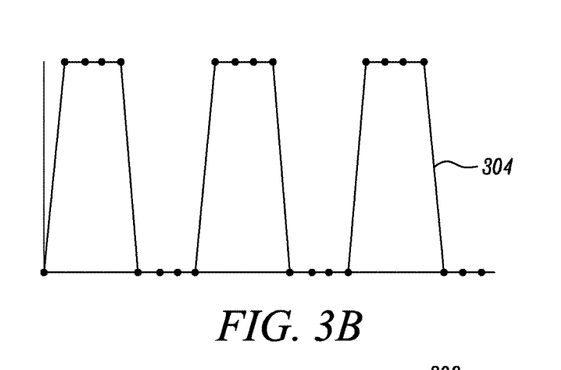

Alternatively, when the response indicates that a first type of information is available, the controller 124 provides a third indication using the first light source 116. The first type of information may be associated with an engine speed of the machine 102. Referring to FIG. 3B, a graph 304 illustrates the third indication provided by the first light source 116. The third indication represents the "slow blink" state during which the first light source 116 blinks slowly. In other words, the first light source 116, is "on" for a first time interval, for example, 3 seconds and then the first light source 116 is "off" for a second time interval, for example 3 seconds and this "on" "off" cycle is repeated to indicate the "slow blink" state.

Figure 3C:
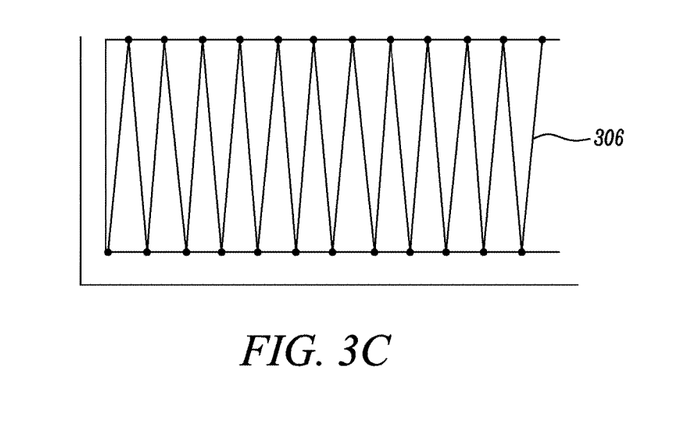

When the response indicates that the second type of information is available, the controller 124 provides a fourth indication using the first light source 116. The second type of information may be associated with a fuel consumption of the machine 102. Referring to FIG. 3C, a graph 306 illustrates the fourth indication provided by the first light source 116. The fourth indication represents the "fast blink" state during which the first light source 116 blinks quickly. For example, the first light source 116, is "on" for 1 second and then the first light source 116 is "off" for 1 second and this "on" "off" cycle is repeated to indicate the "fast blink" state.

Figure 3D:
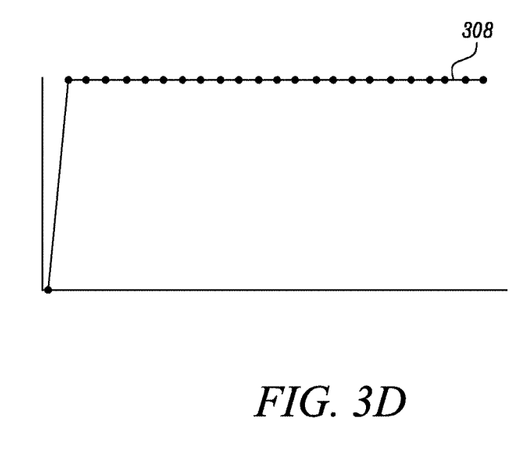

When the response indicates that the third type of information is available, the controller 124 provides a fifth indication using the first light source 116. The third type of information may be associated with a fuel level of the machine 102. Referring to FIG. 3D, a graph 308 illustrates the fifth indication provided by the first light source 116. The fifth indication represents the "solid on" state during which the first light source 116 is "on" continuously. Thus, using the first indication, the second indication, the third indication, the fourth indication and the fifth indication, the first light source 116 may be used to convey availability of different types of information over the data links 110.

The controller 124 is configured to transmit data regarding one or more types of information that are available on the machine 102, to one or more remote devices 130, 132 (as shown in FIG. 1). The data regarding the one or more types of information is transmitted to the remote device over a network. The network may be a cellular network, a satellite network, a Wi-Fi network, or a wired network. The data may relate to the condition of the machine 102 and operation of the machine 102. In some embodiments, the data regarding the plurality of types of information identifies one or more of a location of the machine 102, a start time of the machine 102, a stop time of the machine 102, a fuel level at the start time, a fuel level at the stop time, fuel consumption over a period of time between the start time and the stop time, and correlation of the fuel consumption with engine speed. The data may help in serving the customers better by indicating problem areas for the machine 102. The data regarding the one or more types of information may include a recommendation regarding different data analytics services associated with the one or more types of information. The recommendation, regarding each data analytics service, may be based on the available information out of the plurality of types of information. For example, the controller 124 may transmit a recommendation regarding a first data analytics service including the analysis of the engine speed, the fuel level and the fuel consumption of the machine 102, based on the availability of the plurality of types of information associated with the engine speed, the fuel level and the fuel consumption of the machine 102.

Figure 4:
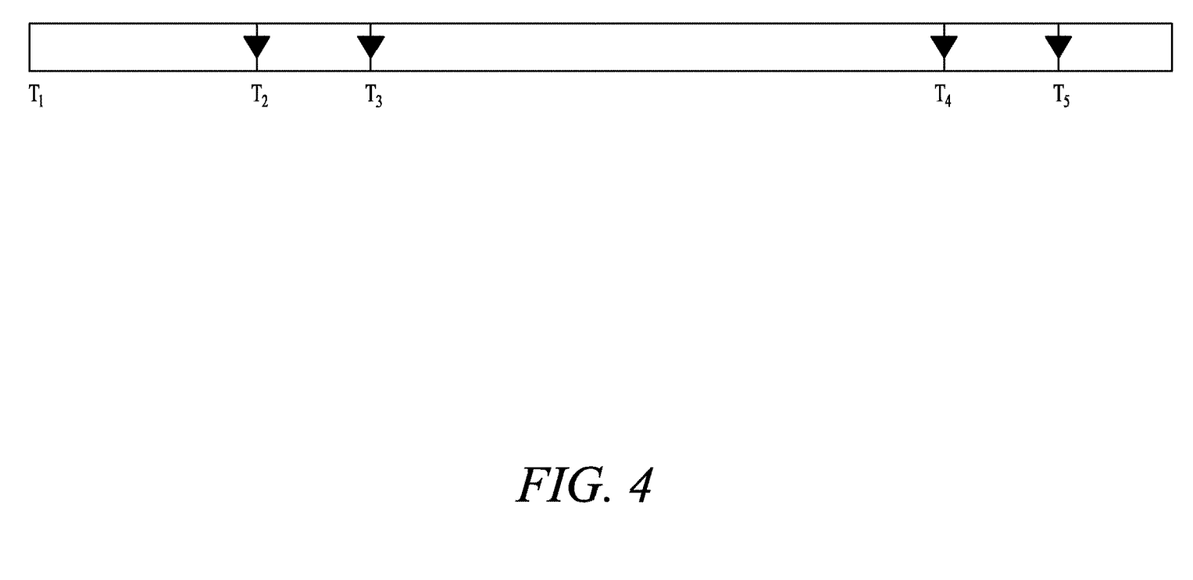
FIG. 4 illustrates a timing diagram corresponding to an operation of the device, in accordance with some embodiments of the present disclosure.

FIG. 4 illustrates a timing diagram corresponding to an operation of the device 104 in accordance with some embodiments of the present invention. Time T1 represents the start of the time axis indicating a reference for measuring the time difference. Time T2 represents a time at which the device 104 is plugged into the machine 102 and the engine of the machine 102 is turned on. If the device 104 detects availability of information on a data link 110, a "slow blink" may be provided by the first light source 116 at time T3. As the device 104 discovers availability of more types of information on the data links 110, the first light source 116 may change the indications accordingly. The "slow blink" state may change to a "fast blink" state or a "solid on" state at time T4 depending on the availability of the different types of information. A time interval from T2 to T4 may represent a discovery period to check for availability of the different types of information on the data links 110. Time T5 represents a time at which a user of the device 104 or a service technician may utilize the knowledge on the availability of the different types of information in selecting a subscription for the data analytics services. For example, an advanced level of subscription may be selected if the information on engine speed, fuel consumption, and fuel level are available on the data links 110.

INDUSTRIAL APPLICABILITY

The present disclosure is related to a device and a method for indicating availability of different types of information on data links associated with the machine 102 using the device 104. In an exemplary operation of the device 104, a service technician in the field may have the device 104, comprising the controller 124, the memory 128, and the user interface 114. The technician may then attach this device 104 to the machine 102 to monitor communication over the data links 110. The controller 124 transmits a query to the machine 102 to check the availability of different types of information related to the machine 102. The query may be transmitted to multiple ECMs 106, 108 and/or machine components 107 of the machine 102 over different data links 110. The controller 124 receives responses from one or more components of the machine 102 (e.g., ECMs 106, 108) connected via the data links 110. Based on the analysis of responses, the controller 124 transmits data regarding the plurality of types of information that are available on the machine 102, to one or more devices 130, 132.

The data may relate to the condition of the machine 102 and operation of the machine 102. For example, the data may include the engine speed, the fuel consumption, and the fuel level associated with the machine 102. The device 104 may also be configured to periodically transmit at least part of the data to the one or more remote devices. In some embodiments, the remote device 130 may transmit the data to at least one other remote device 132. For example, the remote device 130 may transmit the data to the remote device 132 of a service technician and/or the remote device 132 of a customer associated with the machine 102 (such as a user, an owner, and/or a dealer of the machine 102). Based on the data, a service of the machine 102 may be scheduled by the service technician. The data may be used to check the operation of the device 104 and accordingly schedule maintenance of the device 104. In some embodiments, the data regarding the plurality of types of information includes a recommendation regarding different data analytics services, such as subscription level of the device 104, based on the different types of information that are available.

Figure 5A:
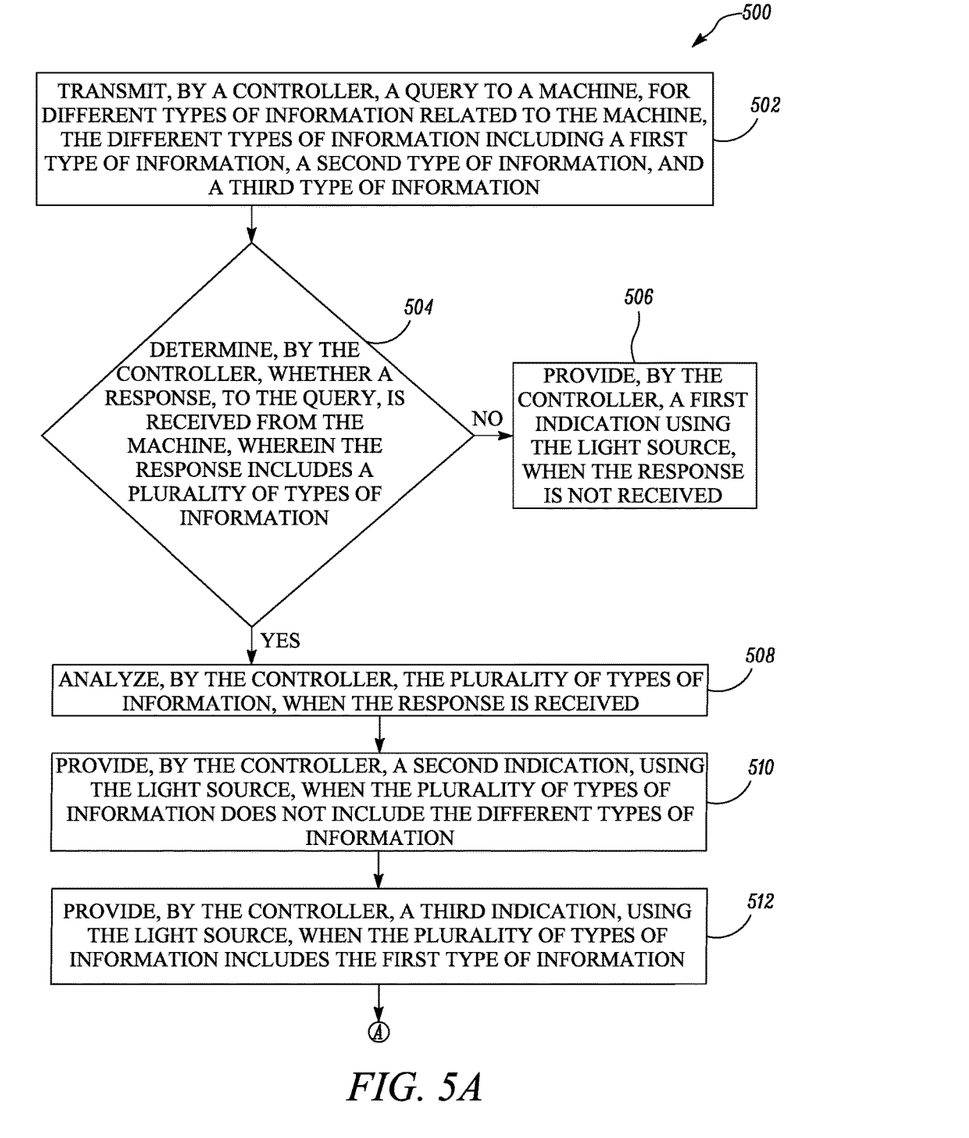
FIGS. 5A and 5B illustrate a flowchart of a method for communicating information associated with the machine using the device, in accordance with some embodiments of the present disclosure.

Referring to FIG. 5A, a method 500 for communicating information associated with the machine 102 using the device 104 is illustrated. The device 104 comprises a light source including the first light source 116. At step 502, the query for different types of information is transmitted by the controller 124 to the machine 102. The different types of information include a first type of information, a second type of information, and a third type of information. The query may be transmitted to multiple ECMS and/or machine components 107 of the machine 102 over at least one of an Ethernet data link, a Society of Automotive Engineers (SAE) standard serial data link, a wireless radio data link, or a wireless satellite data link. At step 504, the controller 124 determines whether a response to the query is received or not. The response includes a plurality of types of information. If the response is not received, the method 500 proceeds to step 506 at which the controller 124 is configured to provide a first indication using the first light source 116. The first indication corresponds to an "off" state and shows that there is no activity over the one or more data links 110 in the machine 102.

When the response is received, the controller 124 analyzes the plurality of types of information at step 508. At step 510, the controller 124 determines that the plurality of types of information include the different types of information are not available and provides the second indication using the first light source 116. At step 512, the controller 124 determines that the plurality of types of information include the first type of information is available and provides the third indication. Referring to step 514 in FIG. 5B, the controller 124 determines that the plurality of types of information include the second type of information is available and provides the fourth indication. At step 516, the controller 124 determines that the plurality of types of information include the third type of information is available and provides the fifth indication.

Figure 5B:
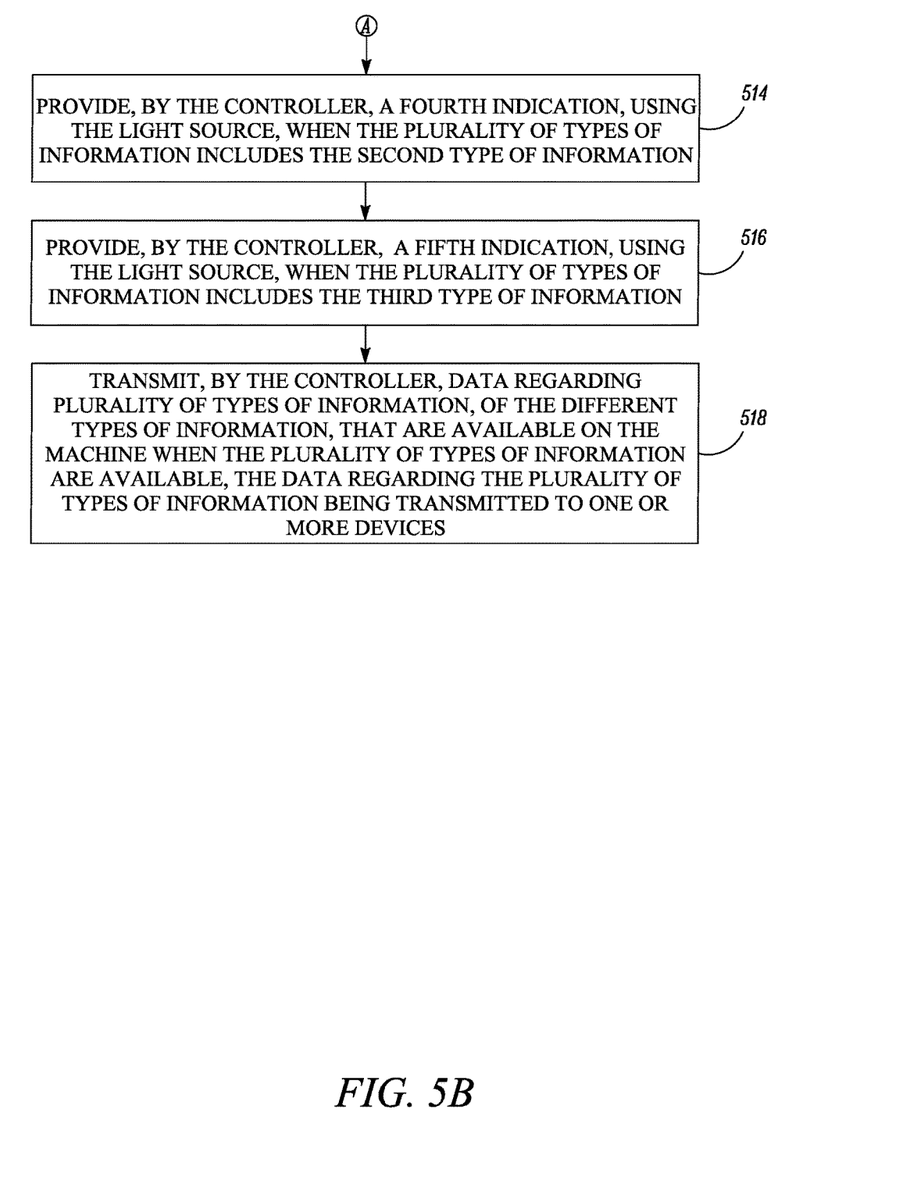

At step 518, the controller 124 transmits data regarding the plurality of types of information that are available on the machine 102 to one or more devices 130, 132. The data regarding the plurality of types of information may be transmitted to the one or more devices 130, 132 over one of a cellular network, a satellite network, a Wi-fi network, or a wired network. The data regarding the plurality of types of information may include a recommendation regarding different data analytics services, associated with the plurality of types of information, for the machine 102. Each data analytics service is based on the one or more types of information of the plurality of types of information. In some embodiments, the data regarding the plurality of types of information identifies one or more of a location of the machine 102, a start time of the machine 102, a stop time of the machine 102, a fuel level at the start time, a fuel level at the stop time, fuel consumption over a period of time between the start time and the stop time, and correlation of the fuel consumption with engine speed.

While aspects of the present disclosure have been particularly shown, and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A device comprising:
    a light source, wherein the light source includes a light-emitting diode (LED); and
    a controller configured to:
        transmit a query, to a machine, for different types of information related to the machine, the different types of information including a first type of information, a second type of information, and a third type of information;
        determine whether a response, to the query, is received from the machine;
        provide a first indication, using the light source, when the response is not received;
        provide a second indication, using the light source, when the response is received and the response indicates that the different types of information are not available;
        provide a third indication, using the light source, when the response is received and the response indicates that the first type of information is available;
        provide a fourth indication, using the light source, when the response is received and the response indicates that the second type of information is available;
        provide a fifth indication, using the light source, when the response is received and the response indicates that the third type of information is available; and
        transmit data regarding one or more types of information, of the different types of information, that are available on the machine when the one or more types of information are available,
            the data regarding the one or more types of information being transmitted to one or more devices.

2. The device of claim 1, wherein the first type of information is associated with an engine speed of the machine.

3. The device of claim 1, wherein the second type of information is associated with a fuel consumption of the machine.

4. The device of claim 1, wherein the third type of information is associated with a fuel level of the machine.

5. The device of claim 1, wherein the query is transmitted to the machine over at least one of an Ethernet data link, a Society of Automotive Engineers (SAE) standard serial data link, a wireless radio data link, or a wireless satellite data link.

6. The device of claim 1, wherein the data regarding the one or more types of information is transmitted to the one or more devices over one of a cellular network, a satellite network, a Wi-fi network, or a wired network.

7. The device of claim 1, wherein the data regarding the one or more types of information includes a recommendation regarding data analytics services, associated with the one or more types of information, for the machine.

8. The device of claim 1 further comprising a user interface including the light source and one or more light-emitting diodes (LEDs), wherein the one or more LEDs provide an output indicative of a status of one or more of a Global Positioning System (GPS) connection, an Internet connection, or a Wi-Fi connection.

9. A system comprising:
    a machine; and
    a device comprising:
        a light source; and
        a controller configured to:
            transmit a query, to a plurality of components of the machine, for different types of information related to the machine,
                the different types of information including a first type of information, a second type of information, and a third type of information;
            determine whether a response, to the query, is received from the plurality of components,
                wherein the response includes a plurality of types of information;
            provide a first indication, using the light source, when the response is not received;
            when the response is received:
                analyze the plurality of types of information,
                provide a second indication, using the light source, when the plurality of types of information does not include the different types of information;
                provide a third indication, using the light source, when the plurality of types of information includes the first type of information;
                provide a fourth indication, using the light source, when the plurality of types of information includes the second type of information;
                provide a fifth indication, using the light source, when the plurality of types of information includes the third type of information; and
            transmit data regarding the plurality of types of information that are available on the machine when the plurality of types of information are available,
                the data regarding the plurality of types of information being transmitted to one or more devices.

10. The system of claim 9, wherein the first type of information is associated with an engine speed of the machine.

11. The system of claim 9, wherein the second type of information is associated with a fuel consumption of the machine.

12. The system of claim 9, wherein the third type of information is associated with a fuel level of the machine.

13. The system of claim 9, wherein the data regarding the plurality of types of information identifies one or more of a location of the machine, a start time of the machine, a stop time of the machine, a fuel level at the start time, a fuel level at the stop time, fuel consumption over a period of time between the start time and the stop time, and correlation of the fuel consumption with engine speed.

14. The system of claim 9, wherein the data regarding the plurality of types of information is transmitted to the one or more devices over one of a cellular network, a satellite network, a Wi-fi network, or a wired network.

15. The system of claim 9, wherein the data regarding the plurality of types of information includes a recommendation regarding different data analytics services, associated with the plurality of types of information, for the machine,
    wherein each data analytics service is based on one or more types of information of the plurality of types of information.

16. The system of claim 9, wherein the plurality of the components of the machine include one or more Engine Control Modules (ECMs).

17. A method for communicating information associated with a machine using a device having a light source, the method comprising:
- transmitting, by a controller, a query to the machine, for different types of information related to the machine,
  - the different types of information including a first type of information, a second type of information, and a third type of information;
- determining, by the controller, whether a response, to the query, is received from the machine,
  - wherein the response includes a plurality of types of information;
- providing, by the controller, a first indication, using the light source, when the response is not received;
- when the response is received:
  - analyzing, by the controller, the plurality of types of information,
  - providing, by the controller, a second indication, using the light source, when the plurality of types of information does not include the different types of information;
  - providing, by the controller, a third indication, using the light source, when the plurality of types of information includes the first type of information;
  - providing, by the controller, a fourth indication, using the light source, when the plurality of types of information includes the second type of information;
  - providing, by the controller, a fifth indication, using the light source, when the plurality of types of information includes the third type of information; and
- transmitting, by the controller, data regarding the plurality of types of information, of the different types of information, that are available on the machine when the plurality of types of information are available,
  - the data regarding the plurality of types of information being transmitted to one or more devices.

18. The method of claim 17, wherein the query is transmitted to the machine over at least one of an Ethernet data link, a Society of Automotive Engineers (SAE) standard serial data link, a wireless radio data link, or a wireless satellite data link.

19. The method of claim 17, wherein the data regarding the plurality of types of information is transmitted to the one or more devices over one of a cellular network, a satellite network, a Wi-fi network, or a wired network.

20. The method of claim 17, wherein the data regarding the plurality of types of information includes a recommendation regarding data analytics services, associated with the plurality of types of information, for the machine.

* * * * *